United States Patent
Meredith et al.

(10) Patent No.: US 11,940,294 B2
(45) Date of Patent: Mar. 26, 2024

(54) ALTITUDE DETERMINATION ACCORDING TO CROWD SOURCED BAROMETRIC PRESSURE MEASUREMENTS

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Zachary Meredith, Roswell, GA (US)

(73) Assignees: AT & T Intellectual Property I, L.P., Atlanta, GA (US); AT & T Mobility II LLC, Atlanta, GA (US)

( * ) Notice: Subject to any disclaimer, the term of this patent is extended or adjusted under 35 U.S.C. 154(b) by 93 days.

(21) Appl. No.: 17/673,848

(22) Filed: Feb. 17, 2022

(65) Prior Publication Data

US 2022/0170741 A1   Jun. 2, 2022

Related U.S. Application Data

(63) Continuation of application No. 16/853,890, filed on Apr. 21, 2020, now Pat. No. 11,287,256.

(51) Int. Cl.
  *G01C 5/06* (2006.01)
  *G01D 21/02* (2006.01)
  *G06F 17/18* (2006.01)

(52) U.S. Cl.
  CPC ............. *G01C 5/06* (2013.01); *G01D 21/02* (2013.01); *G06F 17/18* (2013.01)

(58) Field of Classification Search
  CPC .......... G01C 5/00; G01C 5/06; G01C 21/206; G01C 21/005; G01C 21/3841;
  (Continued)

(56) References Cited

U.S. PATENT DOCUMENTS 10,051,434 B2   8/2018   Chang et al.
2007/0229350 A1   10/2007   Scalisi et al.
(Continued)

FOREIGN PATENT DOCUMENTS

WO   WO-2009015370 A9 *   12/2010   ............. G01W 1/04

OTHER PUBLICATIONS

G. Pipelidis, O. R. M. Rad, D. Iwaszczuk, C. Prehofer and U. Hugentobler, "A novel approach for dynamic vertical indoor mapping through crowd-sourced smartphone sensor data," 2017 International Conference on Indoor Positioning and Indoor Navigation (IPIN), Sapporo, Japan, 2017, pp. 1-8. (Year: 2017).*

(Continued)

*Primary Examiner* — Daniel R Miller
*Assistant Examiner* — Eric Sebastian Von Wald
(74) *Attorney, Agent, or Firm* — Guntin & Gust, PLC; Douglas Schnabel

(57) ABSTRACT

Aspects of the subject disclosure may include, for example, a process that formulates an inference that a first group of mobile devices are at ground level, and obtains, for the first group of mobile devices, positions and barometric pressure readings. Ground heights with respect to a common reference height are determined for the first group of mobile devices, and reference barometric pressures are calculated for the first group of mobile devices, at the common reference height according to the barometric pressure readings and the determined ground heights. At least a portion of the reference barometric pressures are combined to obtain a reference barometric pressure. Other embodiments are disclosed.

20 Claims, 12 Drawing Sheets

(58) Field of Classification Search
CPC .. G01C 21/383; G01C 21/3848; G01D 21/02; G06F 17/18; G06F 3/14; G06F 16/29; G01K 7/00; G01S 19/45; G01S 5/01; G01S 2205/02; G01S 5/0244; G01S 5/02524; G01S 5/02526; G01S 19/23; G01S 5/021; G01S 5/0054; G01S 5/0063; G01S 5/02; G01S 5/0252; G01W 1/02; H04W 4/029; H04W 4/024; H04W 4/33; H04W 4/025; H04W 4/90; H04W 64/00; H04W 4/02; H04W 4/021; H04W 4/38
See application file for complete search history.

(56) References Cited

U.S. PATENT DOCUMENTS

| | | |
|---|---|---|
| 2009/0164115 A1 | 6/2009 | Kosakowski et al. |
| 2010/0318293 A1 | 12/2010 | Brush et al. |
| 2012/0056741 A1 | 3/2012 | Zhu |
| 2012/0182180 A1* | 7/2012 | Wolf .................. G01S 5/14 342/357.29 |
| 2013/0297198 A1 | 11/2013 | Vande Velde et al. |
| 2015/0006100 A1 | 1/2015 | Jackson et al. |
| 2015/0133145 A1 | 5/2015 | Palanki et al. |
| 2015/0204679 A1 | 7/2015 | Aist et al. |
| 2016/0047649 A1 | 2/2016 | Edge et al. |
| 2016/0123740 A1 | 5/2016 | Poornachandran et al. |
| 2016/0245716 A1 | 8/2016 | Gum et al. |
| 2016/0258749 A1 | 9/2016 | Macgougan et al. |
| 2017/0280301 A1* | 9/2017 | Chang .................. H04W 4/024 |
| 2017/0337634 A1* | 11/2017 | Ehrlich .................. H04L 67/52 |
| 2018/0091933 A1 | 3/2018 | Ling |
| 2018/0252521 A1 | 9/2018 | Dormody et al. |
| 2019/0172165 A1 | 6/2019 | Verteletskyi et al. |
| 2019/0353488 A1 | 11/2019 | Kitchel |
| 2019/0360804 A1 | 11/2019 | Dormody et al. |
| 2021/0025717 A1 | 1/2021 | Mendez et al. |
| 2021/0302167 A1 | 9/2021 | Crolley |
| 2021/0325179 A1 | 10/2021 | Meredith et al. |
| 2023/0045033 A1 | 2/2023 | Crolley |

OTHER PUBLICATIONS

Xia H, Wang X, Qiao Y, Jian J, Chang Y. Using Multiple Barometers to Detect the Floor Location of Smart Phones with Built-in Barometric Sensors for Indoor Positioning. Sensors. 2015; 15(4):7857-7877. https://doi.org/10.3390/s150407857 (Year: 2015).*

Chatterjee, Sharmistha & Nurminen, Jukka & Siekkinen, Matti. (2012). Low cost positioning by matching altitude readings with crowd-sourced route data. ACM International Conference Proceeding Series. 169-178. 10.1145/2428955.2428990. (Year: 2012).*

Use your iPhone 6 as a backup altimeter, Oct. 17, 2014, 2 pp.

Bauereiss, Steffen, Baromerter & Altimeter Pro, Feb. 26, 2020, 7 pp.

Falcon, William et al., Predicting Floor-Level For 911 Calls With Neural Networks and Smartphone Sensor Data, Columbia University, Undated , 1 page.

Pipelidis, Georgios et al., Dynamic Vertical Mapping with Crowdsourced Smartphone Sensor Data, Sensors 2018, 18, 480; doi:10.3390/s18020480, pp. 1-25.

Waddell, Kaveh, How Phones Can Help Predict Thunderstorms, The Atlantic, Aug. 11, 2016, pp. 1-10.

Chen, S. et al., "Crowd Map: Accurate Reconstruction of Indoor Floor Plans from Crowdsourced Sensor-Rich Videos", 2015 IEEE 35th International Conference on Distributed Computing Systems, 2015, pp. 1-10, doi: 10.1109/ICDCS.2015.9.

Shin, H. et al., "Wi-Fi Fingerprint-Based Topological Map Building for Indoor User Tracking", 2010 IEEE 16th International Conference on Embedded and Real-Time Computing Systems and Applications, 2010, pp. 105-113, doi: 10.1109/RTCSA.2010.23.

* cited by examiner

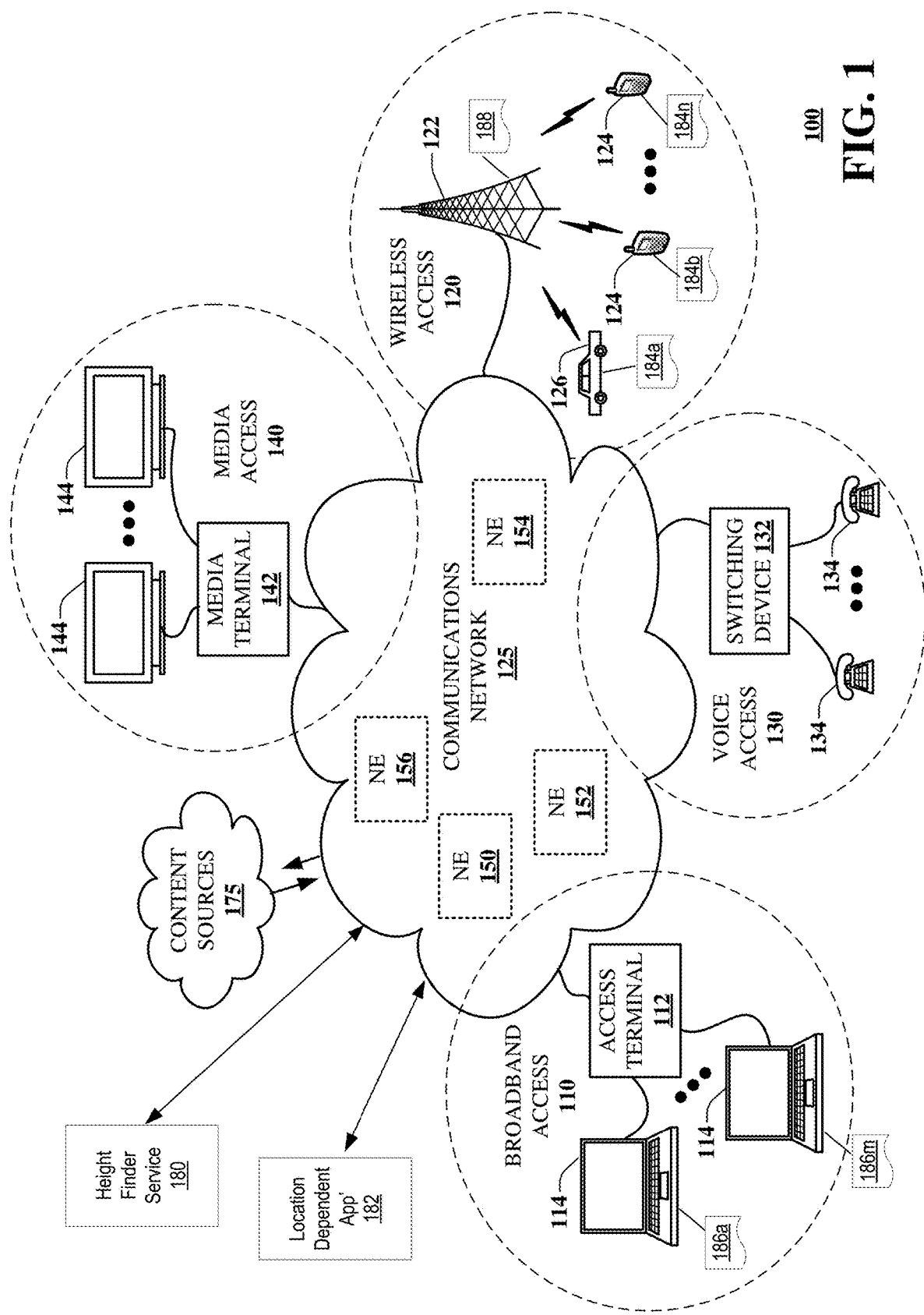

270

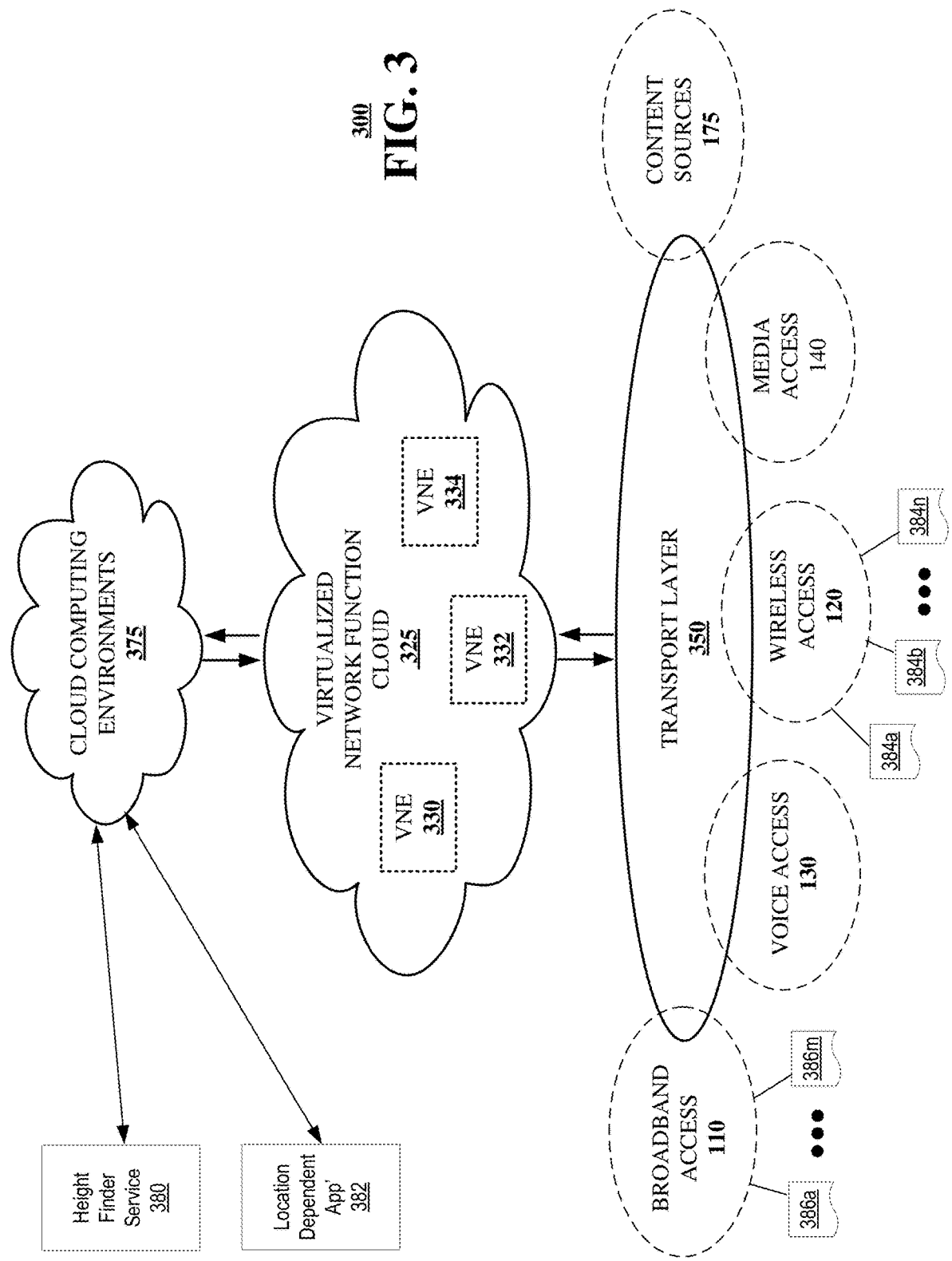

600

ALTITUDE DETERMINATION ACCORDING TO CROWD SOURCED BAROMETRIC PRESSURE MEASUREMENTS

CROSS REFERENCE TO RELATED APPLICATIONS

This application is a continuation of U.S. application Ser. No. 16/853,890, filed Apr. 21, 2020, which is incorporated herein by reference in its entirety.

FIELD OF THE DISCLOSURE

The subject disclosure relates to altitude determination according to crowd sourced barometric pressure measurements.

BACKGROUND

Barometric pressure sensing stations have been proposed for installation at fixed predetermined locations, e.g., by companies such as NextNav. Such installations would be installed at a predetermined and fixed location. Moreover the height of such installations can be known beforehand, e.g., having been surveyed at a time of installation. The fixed location pressure sensing stations can be used to determine an estimate of a barometric pressure within a geographical region that can be used in any number of various applications, not the least of which is to provide altitude locating.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
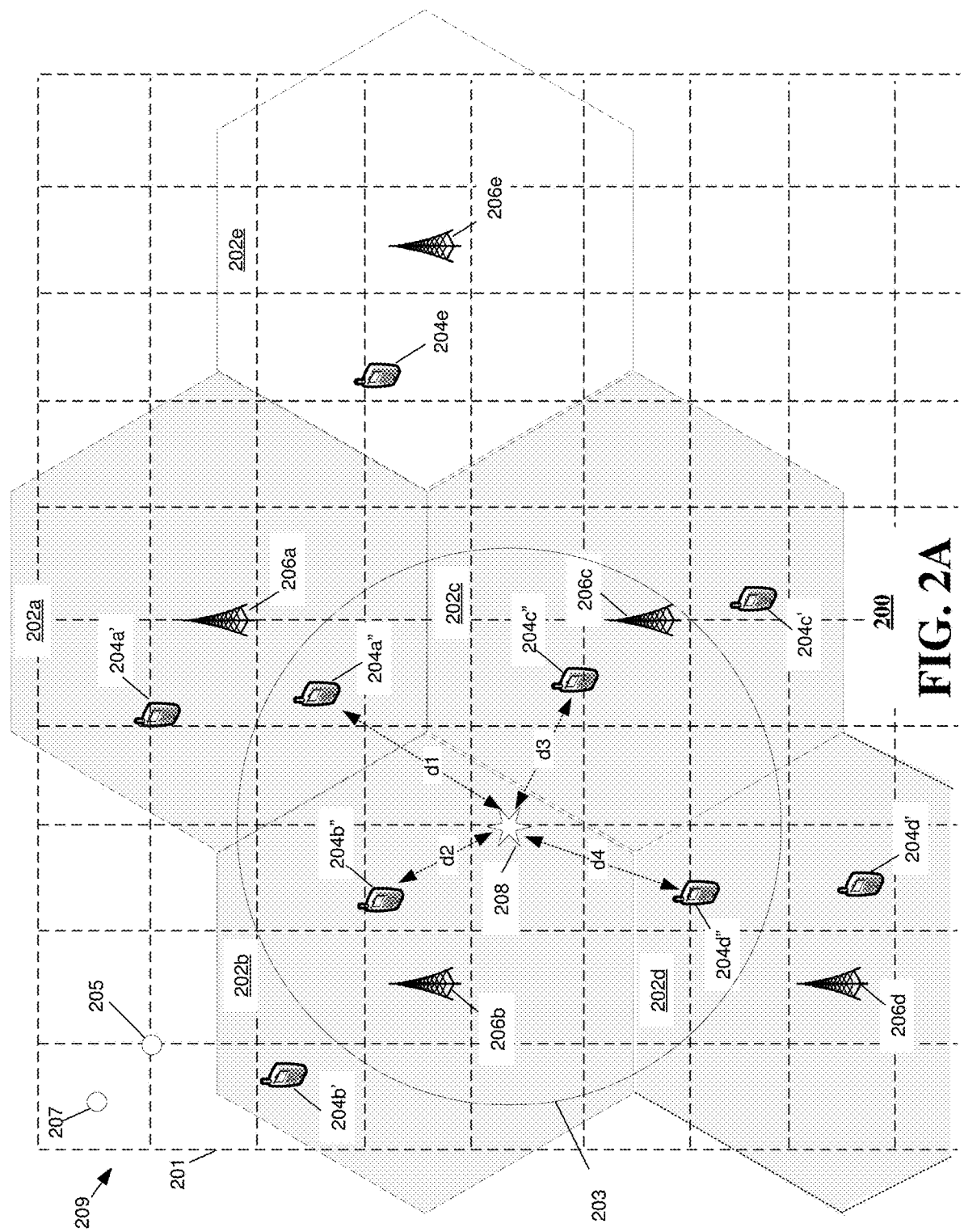
FIG. 2A is a block diagram illustrating an example, non-limiting embodiment of a crowd-sourced, barometric pressure determination system functioning within the communication network of FIG. 1 in accordance with various aspects described herein.

The subject disclosure describes, among other things, illustrative embodiments for performing crowd-sourced, barometric pressure determinations to facilitate estimation of a height of a mobile device above ground according to barometric pressure readings obtained from the mobile device. Preferably, the resulting height estimate is accurate to within a range, e.g., 8-10 ft, suitable to locate the mobile device at a particular floor of a multi-story structure. Other embodiments are described in the subject disclosure.

One or more aspects of the subject disclosure include a device, including a processing system having a processor and a memory that stores executable instructions that, when executed by the processing system, facilitate performance of operations. The operations include determining that a first group of mobile devices are at ground level, and obtaining, for the first group of mobile devices, positions and barometric pressure readings. Ground heights are determined for the first group of mobile devices with respect to a common reference height. Reference barometric pressures are calculated for the first group of mobile devices at the common reference height according to the barometric pressure readings and the determined ground heights, and at least a portion of the reference barometric pressures are averaged to obtain an average reference barometric pressure.

One or more aspects of the subject disclosure include a process that includes formulating, by a processing system including a processor, an inference that a first group of mobile devices are at ground level. Positions and barometric pressure readings are obtained by the processing system and for the first group of mobile devices. Ground heights with respect to a common reference height are determined by the processing system and for the first group of mobile devices, and reference barometric pressures are computed, by the processing system and for the first plurality of mobile devices, at the common reference height according to the barometric pressure readings and the determined ground heights. At least a portion of the reference barometric pressures are averaged by the processing system to obtain an average reference barometric pressure. One or more aspects of the subject disclosure include a non-transitory, machine-readable medium, includes executable instructions that, when executed by a processing system including a processor, facilitate performance of operations. The operations include formulating an inference that a first number of mobile devices are at ground level and obtaining, for the first group of mobile devices, positions and barometric pressure readings. Ground heights are determined with respect to a common reference height for the first group of mobile devices, and reference barometric pressures are calculated at the common reference height according to the barometric pressure readings and the determined ground heights. At least a portion of the reference barometric pressures are combined to obtain a reference barometric pressure.

Referring now to FIG. 1, a block diagram is shown illustrating an example, non-limiting embodiment of a communications network 100 in accordance with various aspects described herein. For example, communications network 100 can facilitate in whole or in part determination of a reference atmospheric pressure grid at a reference elevation, e.g., mean sea-level, based on crowd-sourced pressure readings from mobile devices of opportunity. In at least some embodiments, the communication network 100 can further facilitate in whole or in part determination of a location of a mobile device, including a floor location in a multi-story structure, based on a device reported location and pressure reading, in reference to the crowd-sourced pressure readings. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, such as the example system 100, a location dependent application server 182 is in communication with one or more mobile devices 124, 126 and/or static devices, e.g., 114. The location dependent application server 182 can be adapted to facilitate in whole or in part determination of a reference atmospheric pressure grid at a reference elevation, e.g., mean sea-level, based on crowd-sourced pressure readings from mobile devices of opportunity according to the various techniques disclosed herein. Likewise, in at least some embodiments, such as the example system 100, a location server, illustrated as a height finder service 180 is in communication with one or more mobile devices 124, 126 and/or static devices, e.g., 114, and/or other components of the communication network 125, e.g., one or more of the network elements 150, 152, 154, 156. The height finder service 180 can be adapted to facilitate in whole or in part determination of a height of a mobile device, including its floor location in a multi-story structure, based on a device reported location and pressure reading, in reference to the crowd-sourced pressure readings.

In at least some embodiments, the mobile devices include resident functionality 184a, 184b, . . . 184n, generally 184, e.g., in the form of any one of an operating system, a client, a resident app, and combinations thereof. The resident functionality can be adapted to perform one or more of the techniques disclosed herein, such as obtaining pressure readings, calculation or otherwise computing pressure reading offsets, e.g., according to a barometric pressure equation discussed further below, determining device locations, obtaining ground elevations, determining device heights, converting device heights to equivalent floors of a multi-story structure, reporting such results and so on. In at least some embodiments, the resident functionality 184 operations in cooperation with external functionality, e.g., functionality of other mobile devices and/or services and/or systems. For example, the resident functionality provides client functionality of a client-server arrangement, in which server functionality is provided by another device, such as the height finder service 180 and/or the location dependent application server 182.

Likewise, the stationary devices 114 can be adapted with functionality 186a . . . 186m, generally 186, in the form of any one of an operating system, a client, a resident app, and combinations thereof. The resident functionality 186 can be adapted to perform one or more of the techniques disclosed herein, such as obtaining pressure readings, calculation or otherwise computing pressure reading offsets, e.g., according to a barometric pressure equation discussed further below, determining device locations, obtaining ground elevations, determining device heights, converting device heights to equivalent floors of a multi-story structure, reporting such results and so on. In at least some embodiments, the functionality 186 operations in cooperation with external functionality, e.g., functionality of other devices and/or services and/or systems. For example, the functionality 186 provides client functionality of a client-server arrangement, in which server functionality is provided by another device, such as the height finder service 180 and/or the location dependent application server 182. In some embodiments, the stationary devices 114 can include network enabled devices, such as smart appliances, and the like implementing machine-type communications. It is envisioned that one or more stationary devices 114 can be adapted to determine their location and/or otherwise be associated with a fixed and generally known installation location. To the extent the stationary devices 114 are adapted to measure pressure, they are available to participate in one or more of the various techniques disclosed herein, including determining reference pressure grid, and determining heights of devices based on the reference pressure grid.

FIG. 2A is a block diagram illustrating an example, non-limiting embodiment of a crowd-sourced, barometric pressure determination system 200 functioning within the communication network of FIG. 1 in accordance with various aspects described herein. The system includes an arrangement of cells 202a, 202b, 202c, 202d, 202e, generally 202 providing mobile coverage in a geographic region. The cells 202 include radio systems 206a, 206b, 206c, 206d, 206e, generally 206, that support mobile cellular communications with up to very large numbers of mobile devices. According to the illustrative example, a first radio system 206a of a first cell 202a supports radio communications with a first group of mobile devices 204a' and a second group of mobile devices 204a", a second radio system 206b of a second cell 202b supports radio communications with a first group of mobile devices 204b' and a second group of mobile devices 204b", a third radio system 206c of a third cell 202c supports radio communications with a first group of mobile devices 204c' and a second group of mobile devices 204c", and so on. The radio systems 206 provide radio access networks operating within each cell 204, adapted to establish wireless access with the mobile devices 204a', 204a", 204b', 204b", 204c', 204c", 204d', 204d", and 204e, generally 204, to facilitate voice and/or data communications among the mobile devices 204 and/or with other systems, such as data networks, e.g., the Internet, voice networks, and the like. The radio systems 206 are further adapted to manage handovers of mobile devices 204 between neighboring cells 202, between cells and other systems, e.g., small cells, femto cells, WiFi networks, and the like, to promote mobility and to generally furnish mobile access to network resources in an efficient and cost effective manner.

It is common for mobile devices 204 to be equipped with some form of a location determination function adapted to determine an approximate location of the mobile device 204. Such locations, once determined, may be used by applications, such as map services, resident on the mobile devices 204. Alternatively or in addition, locations can be reported to mobile network operators, e.g., to manage resources, and/or to other back end systems and/or services. By way of example, at least some of the mobile devices 204 may include a global positioning system (GPS) receiver adapted process GPS signals to determine an approximate location of the mobile device on the Earth. Alternatively or in addition, the location receiver may use signals of availability to triangulate it's position in reference to fixed radio sources, such as the radio systems 206. Triangulation calculations may be performed on the mobile device 204, by the mobile network operator, e.g., by the radio systems 206, and any combination thereof. Locations, once determined, generally provide according to a geocoordinate system, provide a position, e.g., a horizontal position as in a latitude-longitude of the mobile device 204, according to a surface of the Earth, or a map. At least some of the location determination functions provide vertical information, e.g., a height or elevation alone or in combination with the horizontal position. It is generally understood, however, that elevation or height information obtained from such systems is determined to a much lower precision, which may not sufficient for many applications, and particularly those used to locate a height of the mobile device 204 to a particular floor of a multi-story building.

Also illustrated in the example crowd-sourced, barometric pressure determination system 200 is a reference grid 209. The example grid is rectangular, each grid element 201 bounding a region of a predetermined area and being separated from adjacent grid elements according to predetermined separation distances. It is understood that other grid patterns may be used, alone or in combination with the example grid pattern 209, such as non-rectangular, regular grids, e.g., triangular grids, hexagonal grids, diamond grids, grid elements having any regular polygon shape. Alternatively or in addition, grid patterns may include non-regular grids, e.g., having non-uniform grid elements, and/or grids having different sized elements. For example, relatively small grid elements may be used in congested areas, e.g., urban areas, areas with high concentrations of multi-story buildings, and/or areas in which barometric pressure is subject to substantial changes. Some examples of grid systems include, without limitation, a military grid reference system (MGRS), a geocoordinate standard used to locate points on the earth. According to the MGRS, a grid may define defines grid squares having side lengths of various distances, e.g., depending upon a precision of coordinates provide, and/or intended applications. By way of example, grid squares may refer to a square having a side length of 10 km (6 mi), 1 km, 100 m (328 ft), 10 m or 1 m, depending on the precision of the coordinates provided. Referenced pressures can be associated with predetermined locations on the grid, such as a center of a grid cell 207 and/or grid vertices 205 between adjacent grid cells.

It is becoming more common for mobile devices 204, such as smart phones, to include environmental sensors, such as magnetic field sensors, inertial sensors, accelerometers, temperature sensors, light sensors, and barometric pressure sensors. As larger numbers of the mobile devices 204 include barometric pressure sensors, it becomes possible to obtain pressure readings from one or more devices and to process such readings. For example, according to the techniques disclosed herein, the pressure readings from a number of the mobile devices 204 can be obtained and processed to determine a barometric pressure at a common reference height, such as mean sea-level pressure (MSLP), which corresponds to an atmospheric pressure at mean sea level (PMSL). This can be accomplished despite the various mobile devices obtaining barometric pressure readings at their respective heights, non of which may be at the reference height. For example, such referencing of pressures can be accomplished according to well understood pressure-altitude relationships. An example equation below, referred to as the barometric formula, relates atmospheric pressure, p, to altitude, h:

$$P = P_b \cdot \left[\frac{T_b}{T_b + L_b \cdot (h - h_b)}\right]^{\frac{g_0 \cdot M}{R^* \cdot L_b}}$$

Where $P_b$ is a static pressure (Pa), $T_b$ is a standard temperature (K), $L_b$ is a standard temperate lapse rate (K/m), h is a height above sea level (m), $h_b$ is a height at a bottom of a layer b (m), $g_0$ is gravitational acceleration (9.8065 m/x2) and M is a molar mass of Earth's air (0.0289644 kg/mol). The equation may be manipulated to solve for different quantities, such as solving for a height above seal level h, given a pressure reading of a device. In such applications, it is observed that pressure of a mobile device obtained at the device altitude may depend upon a static pressure at mean sea-level. As discussed in more detail herein, crowd sourced pressure readings obtained from the mobile devices 204 may be referenced to mean sea-level and combined to determine an average. According to weather patterns, the pressure at mean sea-level may vary depending upon location. Accordingly, the averaged results may be obtained at various locations according the mobile device 204 positions relative to the grid 209. Having obtained mean sea-level equivalent pressures for those devices providing measure results, the pressures can be associated with or otherwise mapped to the grid 209. In at least some embodiments, the referenced mean sea-level pressures are interpolated and/or extrapolated to the grid 209. Such interpolated/extrapolated results can be associated with one or more of grid centers and/or grid vertices.

Figure 2B:
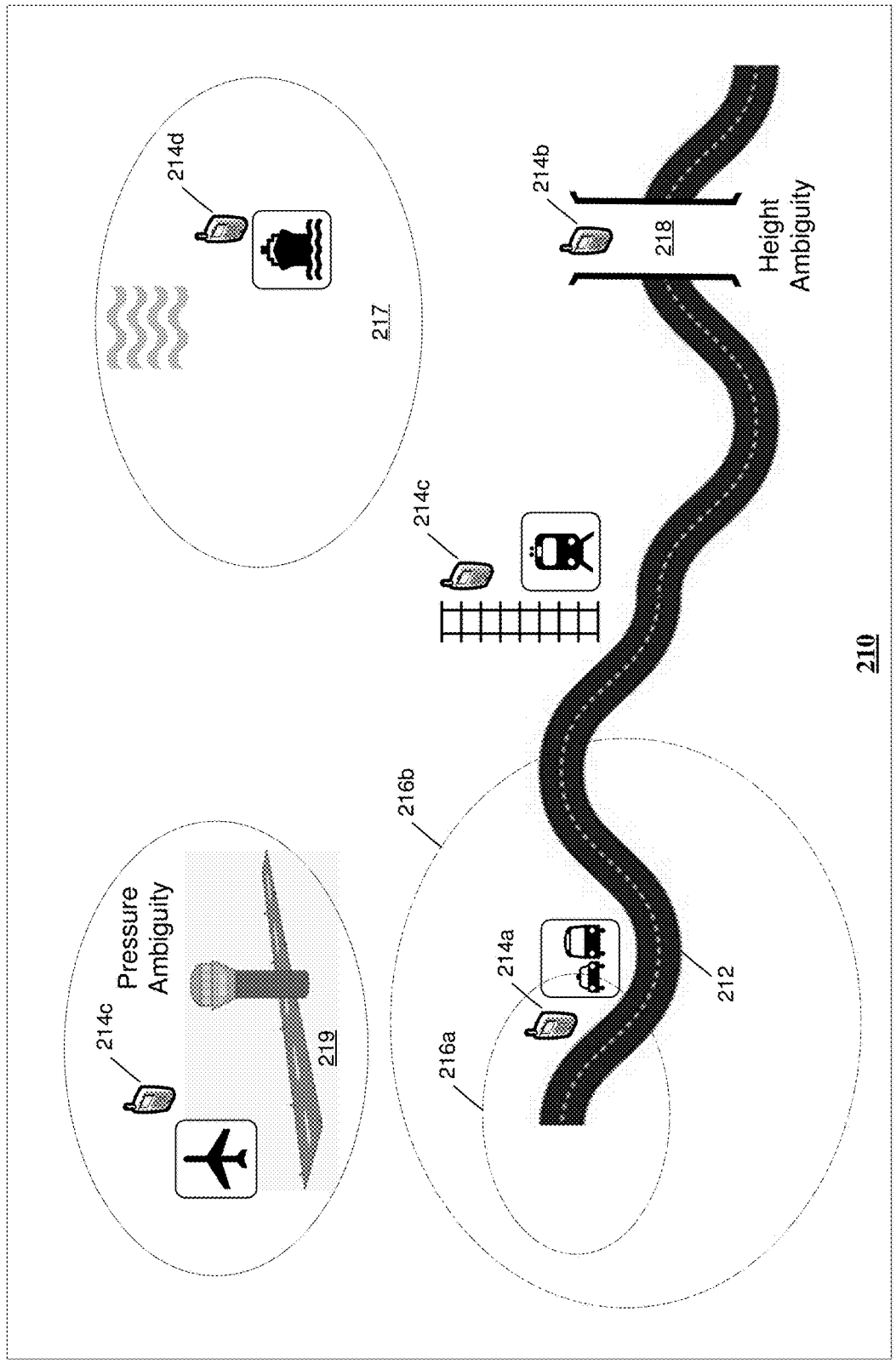
FIG. 2B is a map illustrating an example, non-limiting embodiment of devices from which crowd-sourced, barometric pressure determinations are obtained according to the communication network of FIG. 1, and the crowd-sourced, barometric pressure determination system of FIG. 2A in accordance with various aspects described herein.

FIG. 2B is a map 210 illustrating an example, non-limiting embodiment of devices from which crowd-sourced, barometric pressure determinations are obtained according to the communication network of FIG. 1, and the crowd-sourced, barometric pressure determination system of FIG. 2A in accordance with various aspects described herein. It is realized that any height or altitude data obtained for a mobile device 204, may be unreliable, if available at all. It is also realized that a sufficiently accurate estimate of a height or altitude of each mobile device 204 will be necessary to obtain referenced pressures at mean sea-level. According to the techniques disclosed herein, inferences can be obtained for heights of the mobile devices 204. For example, if a device reports its pressure on a 20$^{th}$ floor of a building, there is no reliable mechanism in the context of a mobile cellular network infrastructure, to determine the height above ground and/or altitude above mean sea-level. Even if the device location were used to determine that the device is within a multi-story building, there is nothing to reliably associate the device with a particular floor level. However, if it can be inferred that the device is at a known level, e.g., ground level, then such information can be used in combination with terrain information identifying ground level as a particular height or altitude above mean sea-level.

In some embodiments, a speed can be associated with a mobile device 214a. For example, the speed can be determined by the device 214a itself e.g., computing a difference in displacement versus a corresponding difference in time between two position measurements. Alternatively or in addition, such speed and/or velocity measurements may be obtained by other system elements, such as the radio systems 206 (FIG. 2A), a mobile network operator, as such information may be determined to allocate radio resources and/or coordinate handover events between cells, and the like. Having obtained speeds in this manner, it is possible to compare the speeds to one or more thresholds to formulate inferences as to a height of the mobile device. For example, speeds above 20 mph may be associated with the device traveling in a ground mode of transportation, such as a car, a bus, a train, and/or a boat. Other speeds may be indicative of jogging and/or cycling.

In formulating an inference that the mobile device is operating at ground level according to a correlation of its determined speed and particular ground mode of transportation, it becomes possible to conclude that the device is operating at ground level, or perhaps at some nominal offset from ground level based on is position on the user's body and/or a position of the user's body from the ground according to an associated transportation device: a car, a bus, a bicycle. Thus, an offset of 3 or 4 ft may suffice for cars, whereas a greater offset may be required, e.g., 5-6 ft, for a car, truck or train. In at least some embodiments, it may be possible to aid in correlation of a mobile device 214a to a particular ground mode of transportation by an association of the device 214a with a particular user account, e.g., a truck driver and/or data obtained from roadway monitoring systems, e.g., a toll system associated by its registration and/or toll debit account with the same user of the mobile device 214a. Alternatively or in addition, horizontal position or geocoordinate information may be combined with a map to associate a location of the device, particular at the time of the pressure reading, with a map feature, such as a roadway 212, a railway, and the like.

Having inferred that the mobile device 214a is at ground level, or at some predetermined offset from ground level, an altitude of the device above a common reference, such as mean sea-level can be obtained by reference to ground elevation data. Such data may be obtained from one or more terrain references, such as a terrain map and/or a terrain database. For example, standard references, such as digital terrain elevation data (DTED) provide a matrix of terrain elevation values. The example map 210 includes iso-elevation contours 216a, 216b that can be used to determine by association and/or interpolation to estimate an elevation of the mobile device 214a to a desired accuracy. The terrain reference can be offset from a predetermined and/or estimated device height above ground, to determine an altitude or height in reference to mean sea-level. The resulting height may be used in combination with the device pressure reading and the barometric formula to determine or otherwise estimate a corresponding atmospheric pressure at mean sea-level.

It is observed that in at least some instances, inferences of the mobile device height may be skewed by one or more circumstances that if not accounted for, could result in elevation ambiguity, which would tend to corrupt crowd sourced data. For example, mobile devices 214c may be in an airplane taxiing on the ground at an airport 219. A determined speed might suggest the mobile device is traveling in a ground mode of transportation, i.e., a taxiing airliner. However, it is understood that airliners may be pressurized, even while on the ground, to a pressure that may differ substantially from an ambient atmospheric pressure outside of the airplane. Such conditions can be referred to as a pressure ambiguity. Namely, even if a correct height of the mobile device 214c is determined above the ground, i.e., the tarmac, even if accounting for a height of the user's body above the ground due to the aircraft structure, the result should not be used, because the pressure reading may not be representative of the ambient atmospheric pressure. Airports can be identified on a map, such that any devices reporting from a location of the airport 219 can be excluded.

Other modes of transportation may include water transport on navigable bodies of water 217. It is understood that mobile devices 214d located on bodies of water 217 can be used as an estimate of mean sea level, however, such readings may be adjusted based on tide levels, and/or excluded from use depending upon sea conditions. For example, if winds result in swells of more than some threshold amount, e.g., at or greater than 4-6 feet, then the readings may be excluded to avoid uncertainty in actual height at a times of pressure readings. Sea conditions, including swell heights may be measured directly and/or estimated, e.g., according to accelerometers on the mobile devices. Alternatively or in addition, such conditions may be obtained form another source, such as a weather service.

Other forms of ambiguity may result from a height ambiguity due to a particular location of a user concluded to be traveling in a ground transportation mode. Some examples of height ambiguity may result from raised roadways, bridges 218, overpasses in which roadways of multiple heights may overlap. In some instances, a height ambiguity, e.g., traveling on a raised roadway, bridge, or railway may be accounted for by associating a position of the device concluded to be engaging in a ground mode of transportation with a feature having a known or otherwise fixed relationship with the ground elevation. For example, height date obtained from a terrain model, can be further offset by a height of the roadway, bridge, railway, etc. If the user's position can be correlated to such a structure, the ambiguity can be reduced or otherwise resolved sufficiently to allow an associated pressure reading to be used with the corresponding height offset. However, for situations in which there may be multiple overlapping possibilities, the device pressure reading can be excluded from determining of a pressure baseline, because the pressure reading may not be representative of the ambient atmospheric pressure.

In some embodiments, a direction of a mobile device 214b is determined in addition to its speed. The direction can be obtained from a velocity, e.g., determined according to updated position information obtained according to a known time interval. Alternatively or in addition, a track can be generated based on historical position data to formulate a bearing or heading of the traveling user device. Such track information can be used to estimate future position and may be combined with map and/or terrain data to associate a moving mobile device 214b with a particular roadway of an overlapping roadway. To the extent such ambiguities are recognized or otherwise determined, pressure data from the corresponding mobile device 214b, 214c can be excluded from processing, such as processing to determine a reference atmospheric pressure at mean sea-level based on crowd-sourced mobile device pressure readings.

Figure 2C:
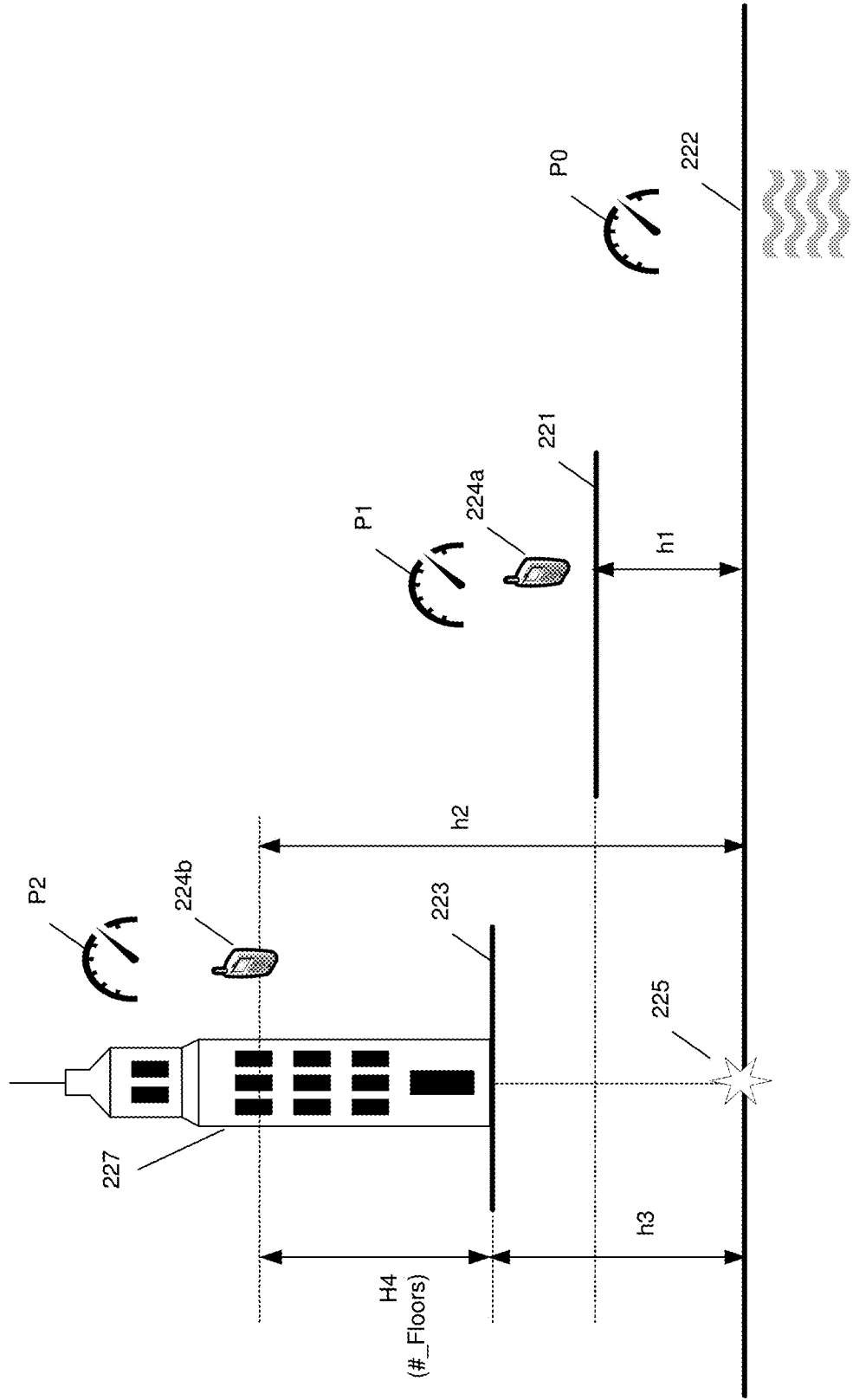
FIG. 2C is a schematic diagram illustrating an example, non-limiting embodiment of a crowd-sourced, barometric pressure determination system functioning within the communication network of FIG. 1, and the crowd-sourced, barometric pressure determination system of FIG. 2A in accordance with various aspects described herein.

FIG. 2C is a schematic diagram illustrating an example, non-limiting embodiment of a crowd-sourced, barometric pressure determination system 220 functioning within the communication network 100 of FIG. 1, and the crowd-sourced, barometric pressure determination system 200 of FIG. 2A in accordance with various aspects described herein. According to the illustrative example, a first pressure reading, P1, is obtained from a first mobile device 224a, inferred to be operating at a first ground level 221 or some nominal offset to ground level 221, e.g., based on a position of the user and/or the mobile device with reference to the body of the user. In the illustrative example, the first ground level 221 can be determined to be a first elevation or first height, h1, above a common reference height, such as mean sea-level 222. A static atmospheric pressure P0 at mean sea-level can be obtained according to the barometric equation based on known parameters, such as the first pressure reading P1 and the first height h1. Other pressure readings from other mobile devices (not shown) can be similarly obtained at their respective heights and processed in similar manners to obtain other independent estimates of the static atmospheric pressure P0' at mean sea-level. It is understood that some variability in results may be accountable to device dependencies, e.g., in pressure sensor calibration. As disclosed further herein below, in at least some embodiments, such device dependencies can be accounted for by applying a calibration offset to effectively normalize results.

The resulting referenced mean sea-level pressures obtained from the normalized pressure readings of multiple devices can be combined to obtain a combined estimate of the pressure readings at a reference location. For example, the resulting pressures may be averaged or otherwise processed in a statistical manner to obtain a mean, average, standard deviation, variance, and the like. Such statistical results may be used in at least some applications, to further enhance accuracies of ambient conditions at mean sea-level, and/or in determining heights based on the same. In order to account for weather variabilities, a weighted average reference pressure at a reference grid location, e.g., target location 208 (FIG. 2A), can be obtained according to pressure readings from multiple devices within a predetermined range of the grid location, e.g., readings from devices 204a", 204b", 204c" and 204d", at respective distances d1, d2, d3 and d4 from the target location 208, the devices being within a predetermined range 203 of the target location 208. Pressure readings obtained from devices closer to the reference grid location being give a greater weight in the averaging that readings obtained from devices further from the reference location.

It is further understood that particular device pressure readings may vary to a greater or lesser extent dependent upon the ambient atmospheric pressure at each device at a time of its pressure readings. According to the weather at the time of the readings, there may be pressure differentials according to device positions. Such differentials are generally more pronounced during windy conditions, wind being an indication of a pressure difference, and less pronounced during calm conditions.

Having obtained an atmospheric pressure P0 at mean sea-level, it is possible to use this result in combination with a pressure reading P3 obtained from a particular mobile device 224b, in order to estimate a height of the particular mobile device 224b above a ground reference 223. A geospatial coordinate reference 225, e.g., a latitude and longitude, or similar horizontal position reference, can be obtained, e.g., from a location receiver of the mobile device 224b. For example, the geospatial coordinate reference 225 may correspond to the target location 208 (FIG. 2A). A ground reference height h3 can be obtained from a terrain reference according to the device location. According to the illustrative example, the device 224b is located at an unknown height h4 above ground level 223, the height can correspond to a particular floor of a multi-story building 227. A reliable determination of a floor level may be crucial in emergency situations in which there is an urgent need to reliably obtain a location of a user of the mobile device 224b, e.g., a 911 caller, and/or first responders operating at the multi-story building 227. The pressure reading P2 of the mobile device 224 can be used to obtain an elevation h2 above mean sea-level according to the barometric equation and using a static pressure P0 at mean sea-level obtained from a grid of predetermined pressure references obtained from crowd-sourced pressure readings. Having determined the elevation h2 of the mobile device 224b above mean sea-level, a height of the device 224b above ground 223 can be determined as a difference between the device elevation h2 and ground elevation above the same reference, i.e., above mean sea-level. The resulting height h4 above ground level can be converted to floors based on a nominal floor spacing and/or a particular floor spacing as may be known beforehand for the multi-story building 227 or otherwise determinable, e.g., by reference. The floor information can be provided alone or in combination with the x-y reference data to aid in a precise location of a 911 caller and/or first responder personnel.

Figure 2D:
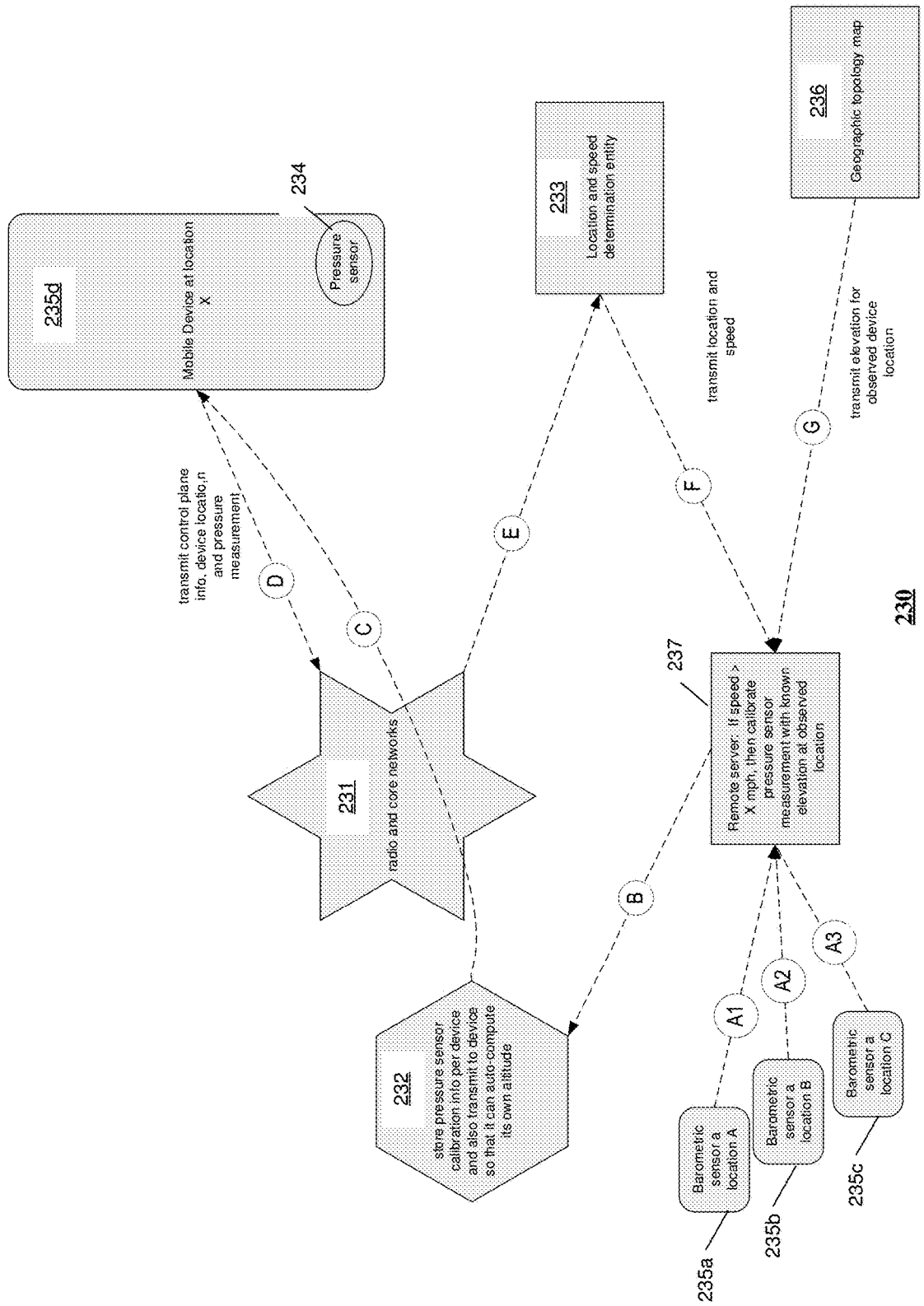
FIG. 2D is a block diagram illustrating an example, non-limiting embodiment of a crowd-sourced, barometric pressure determination system functioning within the communication network of FIG. 1, and the crowd-sourced, barometric pressure determination system of FIG. 2A in accordance with various aspects described herein.

FIG. 2D is a block diagram illustrating an example, non-limiting embodiment of a crowd-sourced, barometric pressure determination system 230 functioning within the communication network of FIG. 1, and the crowd-sourced, barometric pressure determination system of FIG. 2A in accordance with various aspects described herein. The system 230 includes multiple mobile devices 235a, 235b, 235c, generally 235, including barometric pressure sensors adapted obtain atmospheric pressure readings at determinable locations A, B, C. The system 230 further includes a remote server 237 adapted to identify candidate reporting mobile device 235 for inclusion in crowd-sourced pressure applications. The remote server 237 is communicatively coupled to one or more of the mobile devices 235, obtaining therefrom pressure readings at their respective determinable locations.

The system 230 further includes a location and/or speed determination entity 233, a geographic topology reference source 236 and a pressure reading storage device 232, each device 232, 233, 236 communicatively coupled to the remote server 237. In operation, the remote server 237 obtains the pressure readings according to A1, A2, A3. In some embodiments, the remote server 237 also obtains location information A, B, C an associations between the locations and pressure readings. Alternatively or in addition, the remote server 237 may receive the location information from another source, such as radio access, a mobile core network 231 or a separate mobile device location server (not shown).

The remote server 237 obtains elevation data from the geographic topology reference source 236 for each of the reported and/or determined device locations A, B, C. The remote server 237 applies a physical relationship, such as the barometric equation, to offset or otherwise translate the pressure readings obtained from of each of the reporting mobile devices 235, in combination with their determined elevations, to a common reference, such as mean sea-level based. The remote server 237 may apply one or more rules to determine inferences or otherwise estimate proximity of the reporting mobile devices 235 to ground level at their respective locations A, B, C. As disclosed herein, such rules may include inferences drawn upon one or more of a device's position, its speed, direction, user identity, user account information, historical data, and so on. The inferences may result in pressure readings of some of the mobile devices 235 being included in further calculations, e.g., in determining average static atmospheric pressure at mean sea-level, while pressure readings of others of the devices 235 being excluded. Example logic as may be applied in one or more of the rules applied by the remote server 237 is disclose elsewhere in the instant patent application.

In some applications, the remote server 237 determines average pressures at mean sea-level at a number of grid locations and transfers or otherwise stores the results in the pressure reading storage device 232. It is understood that resulting pressure values of a pressure grid will change over time according to external factors, such as the weather and/or according to variations in contributing mobile devices 235 of the crowd-sourced solutions. Accordingly, the reporting and calculation process is repeated periodically to obtain updated pressure values, e.g., updating and storing updated values in an updated and timely pressure value grid.

Pressure value grid updates can be obtained periodically, e.g., according to variability in device report updates. It is recognized that reporting device pressure data will consume device resources, such as batter power, processing resources, storage resources, bandwidth, and the like. In order to preserve mobile device resources, some rules can be applied to limit the mobile device's measuring and/or reporting of pressure data. For example, pressure readings may be provided during periods in which a mobile device is actively communicating with a radio access network and/or core network 231. Consider a pressure reading event occurring responsive to a mobile device reporting schedule, e.g., along with received power levels, quality metrics and the like. Alternatively or in addition, the mobile device may be adapted to report pressure readings according to a schedule, e.g., every X minutes. In some embodiments, such scheduled reporting can occur regardless of a state of the mobile device, e.g., the device becoming active and transmitting pressure data through the radio access network 231 responsive to the scheduled reporting cycle. Alternatively or in addition, such a schedule can be applied based on other factors, e.g., report according to a first reporting period based on a high batter charge, and reporting to a second, longer reporting period based on a lower batter charge, in some instances terminating reporting if the device power is determined to be below a corresponding threshold.

In at least some embodiments, reporting can be initiated remotely from the device. For example, the radio access network 231 and/or the remote server 237 may send a message to one or more of the mobile devices 235 in order to prompt the mobile device 235 to measure and/or report its ambient barometric pressure. Such external requests for pressure data can drive the device reporting completely and/or in combination with a device reporting policy. For example, a mobile device 235 may be adapted to report pressure according to a casual schedule, e.g., during events of opportunity, or according to a relatively length reporting period. However, when a device location service, e.g., a 911 service and/or a first responder service, has been activated to track particular mobile devices, the mobile device reporting may be altered to report according to a more frequent internally determined schedule or rule and/or according to specific request or queries from the remote server 237 and/or the radio access network 231.

According to the illustrative example, the remote server 237 is utilized to determine a height above ground or corresponding floor of a multi-story building for a mobile device 235*d* of a 911 caller. The mobile device 235*d* may respond to a prompt by the remote server 237 and/or a separate 911 or first responder location service, to obtain a current pressure reading and to provide the pressure reading to the remote server 237. The mobile device 235*d* obtains the pressure reading using an onboard pressure sensor 234. The pressure reading can be provided to the remote server 237 along with the device position via the radio access network 231. The remote server 237 can be adapted to obtain ground elevation by accessing the geographic topology reference source 236, e.g., server and/or database, and to obtain a corresponding and current static atmospheric pressure at sea level at the device's location by interpolating results stored and updated at the pressure reading storage device 232. The remote server 237 determines a height of the mobile device 235*d* above mean sea-level based on the device reported pressure and the reference grid pressure obtained from the pressure reading storage device 232. The remote server 237 proceeds to calculate a height of the device above its local ground position by determining a difference between the device determined elevation and ground level obtained from the geographic topology reference source 236. The resulting height above ground can be resolved to a particular floor and reported using a 911 service, and/or a first responder tracking app.

Although the illustrative example, referred to much of the processing occurring at the remote server 237, it is understood in at least some embodiments, some or substantially all of the processing can be accomplished in a resident client or app at the mobile device 235*d*, at the radio access network and/or mobile core network 231, and/or at an associated application server, e.g., a back-end server. It is understood that at least some of the processing can be performed in a redundant manner, e.g., at the mobile device 235*d* and at one or more of the remote server 237, the radio access network and/or mobile core network 231 and/or an associated application server.

Figure 2E:
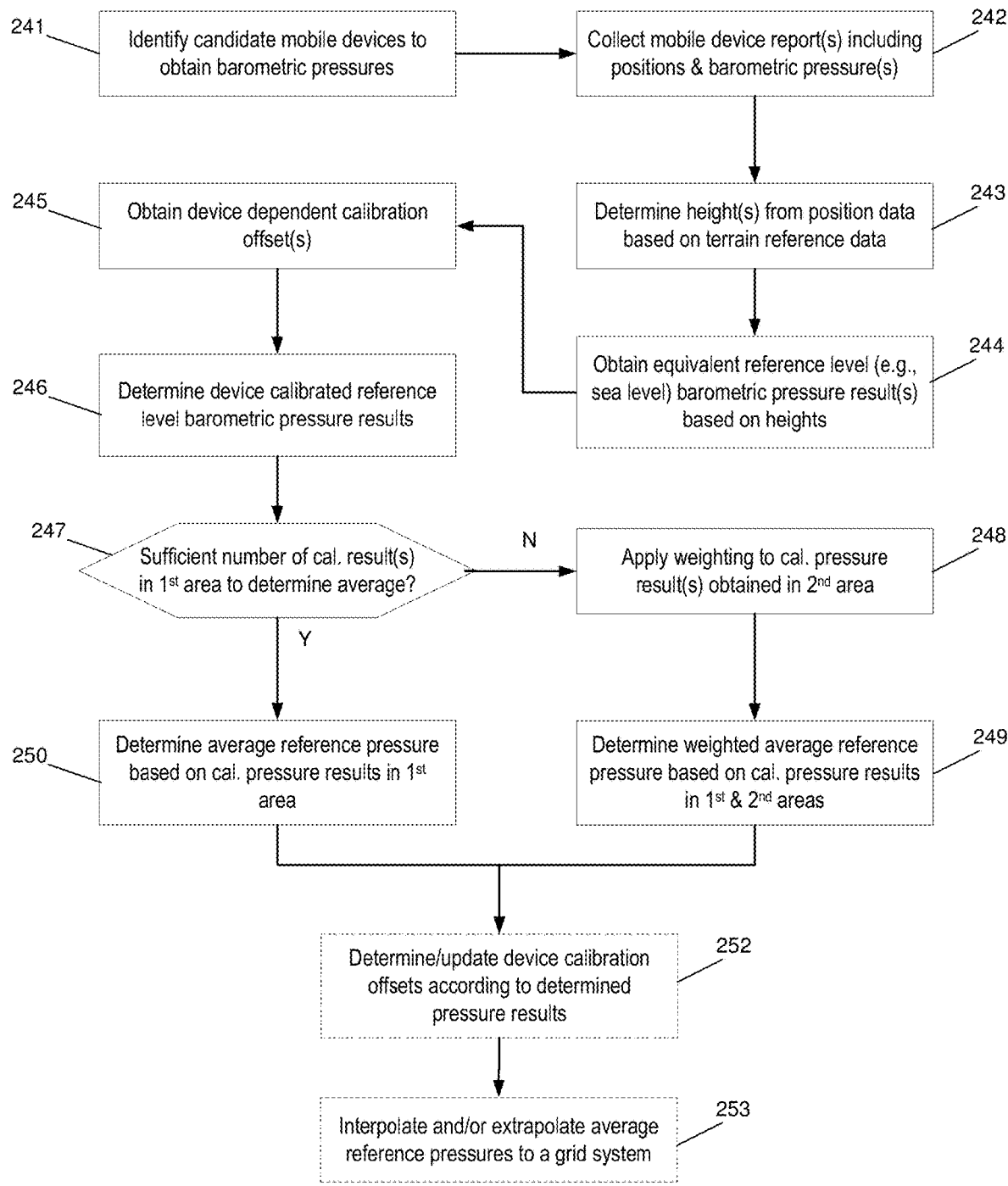
FIG. 2E depicts an illustrative embodiment of a process adapted to obtain crowd-sourced, reference barometric pressure determinations in accordance with various aspects described herein.

FIG. 2E depicts an illustrative embodiment of a process 240 adapted to obtain crowd-sourced, reference barometric pressure determinations in accordance with various aspects described herein. According to the process, 240, candidate mobile devices to obtain barometric pressures are identified at 241. Identification of such devices can depend on any one or more of the various techniques disclosed herein, including, but not limited to, devices being located in a particular geographic region, such as a state, county, city or town, according to cell coverage maps, mobile carriers, mobile device status, e.g., active, standby, user preferences, application necessities, and the like. It is understood that in at least some embodiments, identification of candidate mobile devices is based on inferences, e.g., that a device is operating on a roadway at ground level.

Alternatively or in addition, it is understood that in at least some applications, identification of candidate devices includes excluding certain mobile devices that might otherwise be operating in a region of interest. Such exclusions can be based on predetermined rules implemented by one or more of reporting mobile devices, radio access networks, mobile core networks, application servers, and the like. Such rules might operate to exclude devices for which reported results may be misleading, inaccurate and/or ambiguous.

In some embodiments, determinations as to includes and/or exclusions of mobile devices may be determined before the mobile devices measure and/or otherwise report pressure data. Accordingly devices that would otherwise be excluded from candidate reporting devices can forego the measuring and/or reporting to conserve device and/or network resources. Alternatively, at least some of the devices may report their pressures and/or locations allowing identification of candidate mobile devices at 241 to occur after the fact. Since a determination of candidates may depend on applications, some reports may be accepted from some mobile devices according to a first application and excluded from the same mobile devices according to a second, e.g., more stringent, application.

Collect mobile device report(s) including positions and/or barometric pressure(s) are obtained at 242. Once again, in some embodiments, the reports can be obtained only from those identified candidate mobile devices, while in other embodiments, the reports can be obtained from a larger group of mobile devices, with only those reports from the candidate devices identified at 241 being processed further according to the process 240.

Height(s) of the candidate and reporting mobile devices above the ground are determined at 243. The heights can be determined from the reported position data obtained at 242. For example, ground level can be obtained according to geographical terrain data according to a location of the device reported position upon the terrain data. A predetermined physical relationship, such as the barometric equation, can be applied to the reported pressure readings and the determined, estimated or otherwise inferred ground elevation to obtain an estimate of a static atmospheric pressure result(s) at a reference level (e.g., mean sea-level), at the device location.

In at least some embodiments, a device dependent calibration offset can be obtained at 245 and applied to the calculated pressure at mean sea-level obtained at 246. Although the process 240 reflects the device dependent calibration offset being applied to the resulting estimate of mean sea-level pressure, it is understood that the offset can be applied at other stages of the processing, e.g., at or immediately following the collecting of the mobile device reports at 242. As some applications may require access to the raw reported device pressure data, it is illustrated as an independent step.

In at least some embodiments, a determination is made at 245 as to whether a sufficient number of calibrated reference pressure results at mean sea-level have been determined in a first area of interest. To the extent the number of devices is deemed sufficient at 247, an average reference pressure is determined at 250. In at least some embodiments, the average pressure is determined according to a weighted average in which reporting mobile devices located closer to a location, e.g., a grid location, of the determined average pressure being give more weight than reporting devices located further away.

In at least some embodiments, the area of interest is determined according to reference pressure grid location for which the average pressure is being determined. In such instances the area of interest may be a corresponding area of the particular grid, e.g., a 100 meter grid. To the extent the first area is the 100 meter grid, only reporting devices from within the grad and/or perhaps immediately adjacent grids can be used if it is determined at 247 that a sufficient number of results are available.

To the extent the number of devices is deemed insufficient at 247, a weighting is applied to pressure results obtained from devices reporting in a second area, which is generally larger than the first area. In at least some embodiments, the average pressure is determined according to a weighted average in which reporting mobile devices located closer to a location, e.g., a grid location, of the determined average pressure being give more weight than reporting devices located further away. For example, the second area may be a 1 km grid or a 10 km grid that includes the particular 100 m grid for which a pressure value is being determined. A weighted average reference pressure is determined at 249.

In at least some embodiments, the process 240 optionally includes a determination and/or update of one or more device-dependent calibration offsets at 252 (shown in phantom). An example calibration process is describe in more detail hereinbelow.

In least some embodiments, the process 240 optionally includes an interpolation and/or extrapolation of resulting average references to a predetermined a grid system at 253. Pressures across such a grid can be determined and periodically updated to maintain their relevancy in subsequent determinations of device heights and/or floor levels based on the pressure grid. In some embodiments, the process 240 is repeated in part or in its entirety to obtain updated pressure results, e.g., to populate the reference grid with updated pressure measurements. It is envisioned that a time between updates may be substantially continuous, and/or according to a predetermined schedule, and/or according to an event. For example, an application request for determination of a location of a 911 caller or first responder can initiate an update of the pressure reference grid. Alternatively or in addition, a periodicity of the updates can depend upon weather, e.g., occurring less frequently during relatively static weather with little or no wind and occurring more frequently during relative dynamic weather or windy conditions. Accordingly, it is envisioned that one or more of the example systems and/or processed disclosed herein may be adapted to accept weather data, e.g., from dedicated weather sensing system and/or from a weather feed.

Figure 2F:
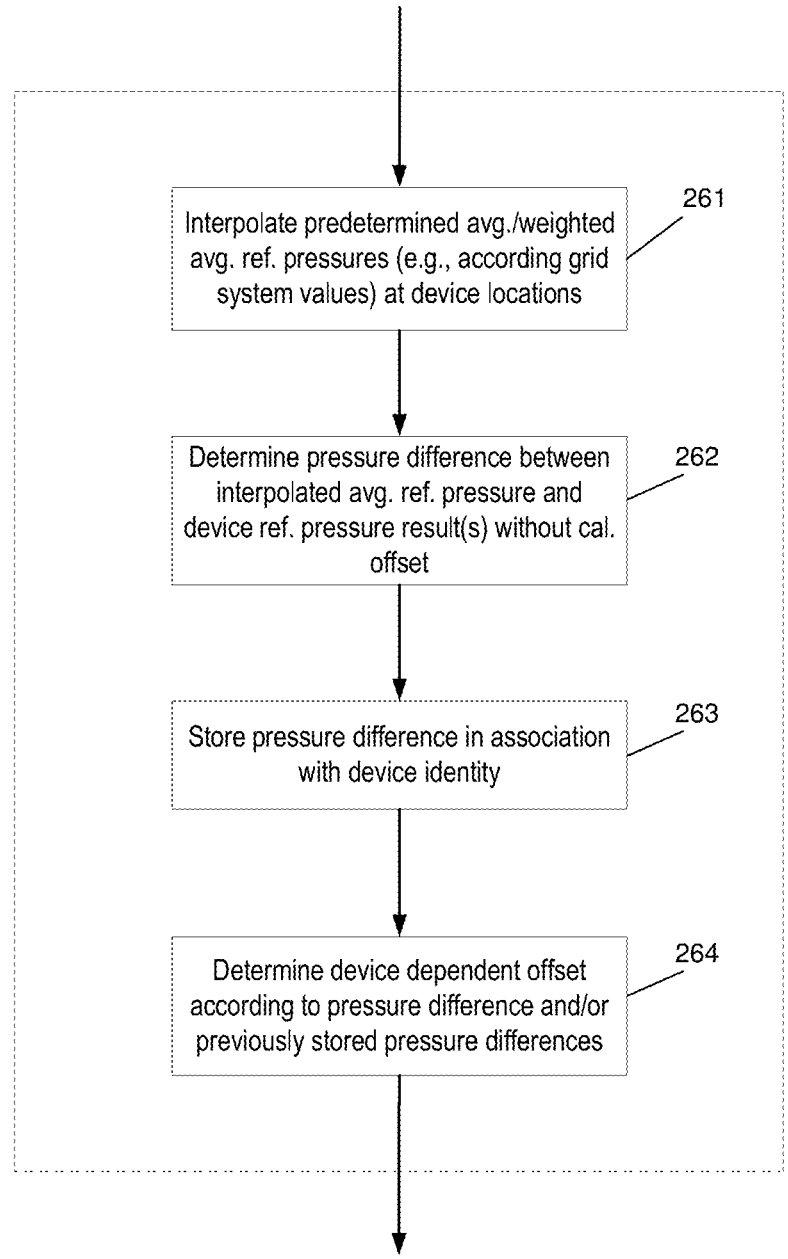
FIG. 2F depicts an illustrative embodiment of a process adapted to obtain a device dependent calibration offset to facilitate obtaining the crowd-sourced, barometric pressure determinations of the process of FIG. 2E and in accordance with various aspects described herein.

FIG. 2F depicts an illustrative embodiment of an example process 252 adapted to obtain a device dependent calibration offset to facilitate obtaining the crowd-sourced, barometric pressure determinations of the process of FIG. 2E and in accordance with various aspects described herein. A predetermined average and/or weighted average reference pressure is determined at a location of the particular reporting device being calibrated at 261. For example, the reference pressure can be obtained from a reference pressure grid, by interpolating grid pressure values to a location of the particular reporting device with respect to the grid locations A pressure difference between the interpolated average/weighted average reference pressure and a current reference pressure determined at 262, at the reporting device location based on a current reported pressure measurement obtained from the reporting device. Any previously determined calibration offset values determined for the device are not applied to the device reported pressure. The resulting pressure differences can be stored at 263, according to a historical record for the device. A length or depth of any such pressure difference storage arrays may be configured to store results for the device since inception, since a recent power on event, according to a predetermined reporting period and/or according to external information, such as weather conditions, e.g., static, dynamic.

A device-dependent offset can be determined at 264, according to one or more of the current and/or previously determined pressure differences stored in the pressure difference storage arrays. By way of example, and without limitation, the device-dependent offset can be based entirely on a current determination. Alternatively or in addition, the device-dependent offset can be determined according to some number of previously determined offsets from the same device, e.g., according to the past 10 results, according to current and previous results obtained within a predetermined time window, e.g., within 24 hours, within 1 week, within 1 month. Such time windows can be selected and/or altered according to device variability expectations, past historical results, manufacturer recommendations, and the like. In at least some embodiments, the time window can be based on an event, such as a weather condition and/or a change in a weather condition. For example, a change in weather conditions from static to dynamic or dynamic to static may allow for some variation in the time windows, either expanding or compressing the window, as the case may be.

Figure 2G:
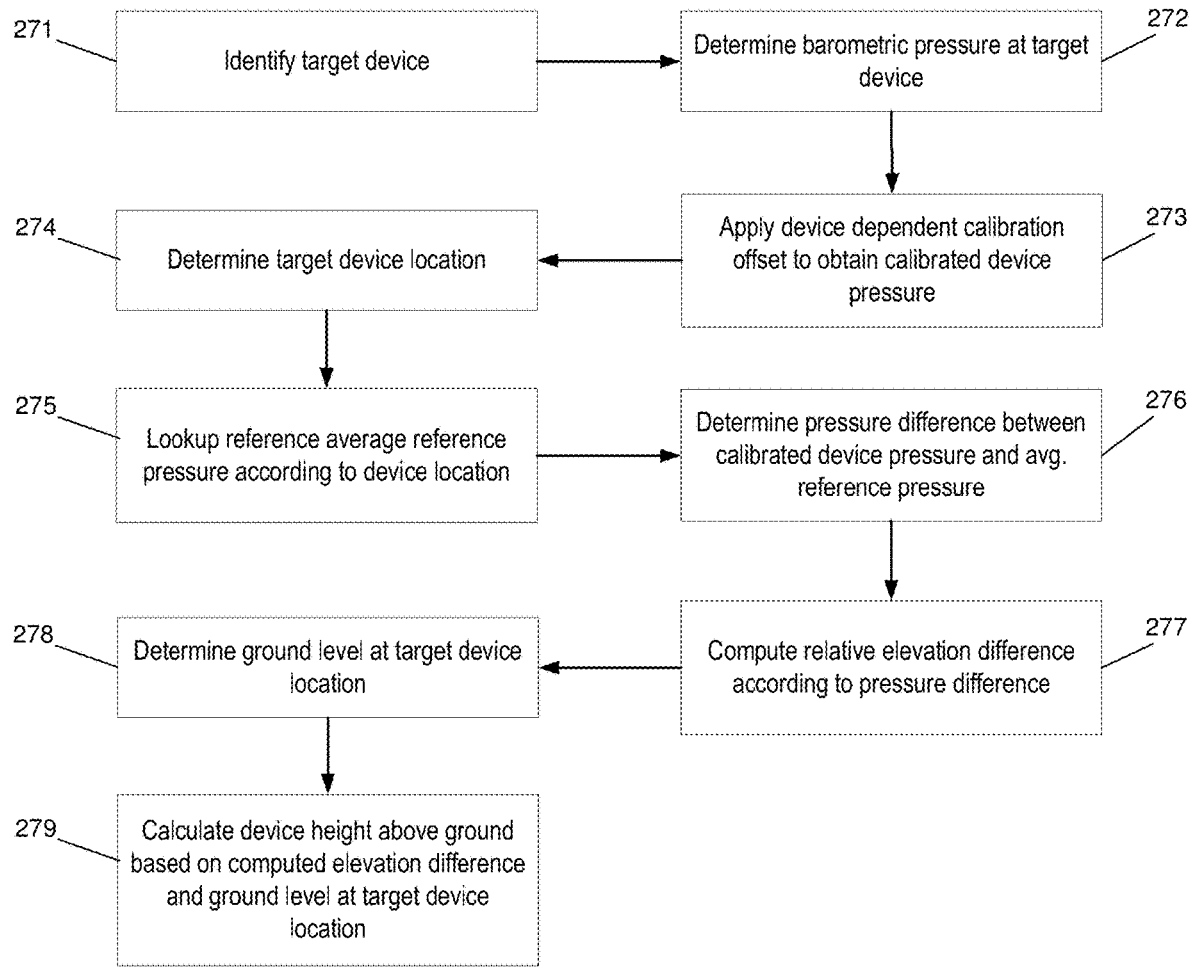
FIG. 2G depicts an illustrative embodiment of a process adapted to obtain an estimated height of a mobile device in accordance with the crowd-sourced, reference barometric pressure determinations of the process of FIG. 2E and in accordance with various aspects described herein.

FIG. 2G depicts an illustrative embodiment of a process 270 adapted to obtain an estimated height of a mobile device in accordance with the crowd-sourced, reference barometric pressure determinations of the process of FIG. 2E and in accordance with various aspects described herein. The process 270 includes identifying a target device at 271. A target device or devices may be determined according to devices for which a location is required. Examples include, without limitation, a device of a 911 caller, devices of first responders, e.g., firefighters, emergency medical technicians (EMTs), paramedics, and the like. For example, a 911 system can be adapted to provide an identity of the 911 calling device to satisfy the identification of the target device. Alternatively or in addition, devices of firefighters, police and/or medical personal responding to an emergency situation may be identified by their respective agencies, by the 911 emergency service, and/or directly by the emergency personnel, e.g., selecting an alert message from their mobile devices to initiate target identification. In at least some embodiments, identification of target devices can be according to mobility or lack thereof of first responders at a scene of an emergency situation.

For example, it may be determined from a firefighter's device reporting updated positions of the firefighter that the individual has stopped moving for a predetermined period of time, or that other sensors, such as fire, light, smoke, impact, accelerometers and the like may indicate a possible injury. Upon detection of such events, the emergency system and/or the first responder's mobile device can identify itself as a target device.

A determination of ambient barometric pressure at the target device is obtained 272. This measurement can be obtained using a pressure sensing device resident at the mobile device. Alternatively or in addition, the pressure can be obtained by another device, such as a dongle, or local device, such as a separate pressure sensing on the user's person and in communication with the mobile device, e.g., according to a wireless protocol, such as a Bluetooth wireless protocol. To the extent that a device-dependent pressure offset value, e.g., a device calibration value is available, the calibration offset is applied at 273, to the pressure reading to obtain calibrated device pressure reading.

The process 270 continues with obtaining a location of the target device at 274. A location of the device can be determined according to any suitable technique, including but not limited to using a device resident location receiver or location system. Such systems may rely on GPS data, inertial data, network provided data, and the like. In some embodiments, a position of the device can be determined or otherwise estimated by external systems, such as the radio access network, proximity to wireless access points, and the like.

Having determined the device's approximate location, a lookup can be performed at 275 to obtain a corresponding reference atmospheric pressure, e.g., according to a maintained reference pressure grid determined and/or otherwise maintained according to crowd-sourced pressure reading. Depending on a location of the target mobile device to the reference grid, interpolation and/or extrapolation can be applied to determine or otherwise obtain a more precise estimate of a reference pressure at the location of the target device.

A pressure difference between the calibrated device measured pressure and the reference pressure is obtained at 276. The pressure difference generally corresponds to a difference in elevation between the measured pressure and the reference pressure. For applications in which the reference pressure is at mean sea-level, the resulting pressure offset can be applied to a physical relationship, such as the barometric equation, to determine an elevation difference at 277.

A ground level at target device location can be determined at 278, e.g., according to a geographical topology reference, and a height of the reporting device above ground can be determined at 279, based on a difference between the computed elevation and ground level at the target device location. It is understood that a resulting difference in feet or meters can be converted to a corresponding floor of a multi-story structure based on one or more of average number of feet or meters per story and/or facilities device for the particular structure that may include non-standard and/or varying heights of the different stories.

While for purposes of simplicity of explanation, the respective processes are shown and described as a series of blocks in FIGS. 2E, 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and processes 240, 252 and 270 presented in FIGS. 1, 2A, 2E, 2F, 2G and 3. For example, virtualized communication network 300 can facilitate in whole or in part determination of a reference atmospheric pressure grid at a reference elevation, e.g., mean sea-level, based on crowd-sourced pressure readings from mobile devices of opportunity. In at least some embodiments, the virtualized communication network 300 can further facilitate in whole or in part determination of a location of a mobile device, including a floor location in a multi-story structure, based on a device reported location and pressure reading, in reference to the crowd-sourced pressure readings.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In some embodiments, such as the example system 300, a location dependent application 382 is in communication with one or more mobile devices 384a, 384b, . . . 384n, generally 284 and/or one or more static devices, 386a . . . 386m, generally 386. The location dependent application 382 can be adapted to facilitate in whole or in part determination of a reference atmospheric pressure grid at a reference elevation, e.g., mean sea-level, based on crowd-sourced pressure readings from mobile devices of opportunity according to the various techniques disclosed herein. Likewise, in at least some embodiments, such as the example system 300, a location server, illustrated as a height finder service 380 is in communication with one or more mobile devices 384 and/or static devices, e.g., 386, and/or other components of the communication network virtualized network function, e.g., one or more of the virtual network elements 330, 332, 334. The height finder service 380 can be adapted to facilitate in whole or in part determination of a height of a mobile device, including its floor location in a multi-story structure, based on a device reported location and pressure reading, in reference to the crowd-sourced pressure readings.

In at least some embodiments, the mobile devices include location determining functionality, e.g., in the form of any one of an operating system, a client, a resident app, and combinations thereof. The resident functionality can be adapted to perform one or more of the techniques disclosed herein, such as obtaining pressure readings, calculation or otherwise computing pressure reading offsets, e.g., according to a barometric pressure equation discussed further below, determining device locations, obtaining ground elevations, determining device heights, converting device heights to equivalent floors of a multi-story structure, reporting such results and so on.

Figure 4:
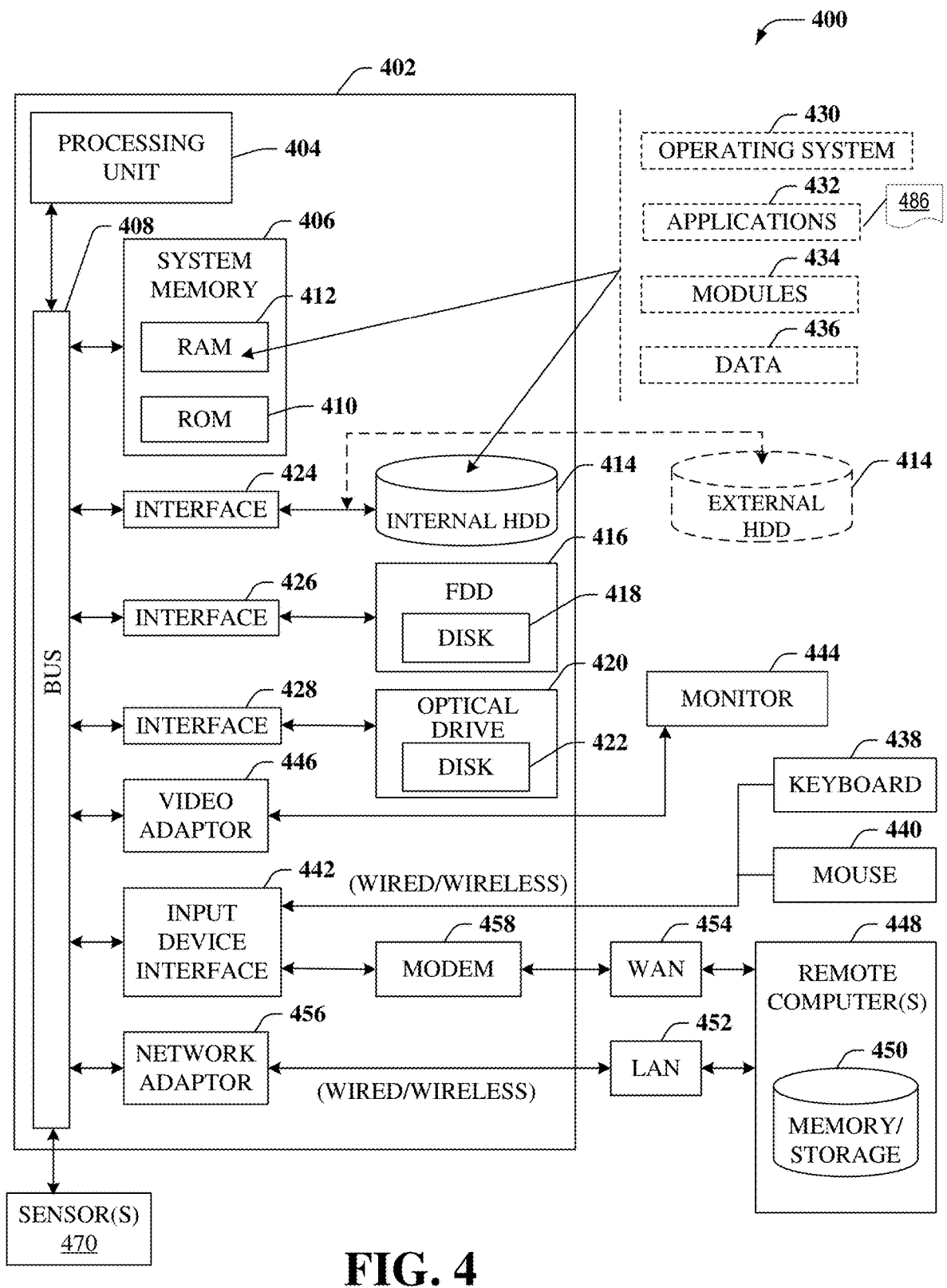
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part determination of a reference atmospheric pressure grid at a reference elevation, e.g., mean sea-level, based on crowd-sourced pressure readings from mobile devices of opportunity. In at least some embodiments, the computing environment 400 can further facilitate in whole or in part determination of a location of a mobile device, including a floor location in a multi-story structure, based on a device reported location and pressure reading, in reference to the crowd-sourced pressure readings.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

When used in a crowd-sourced pressure and/or location determining based on crowd-sourced pressure application, the computer 402 can include one or more pressure sensors 470 adapted to measure atmospheric pressure proximate to the one or more pressure sensors 470. Alternatively or in addition, one or more of the applications 432 can be adapted to include functionality 486 directed to determination of a reference atmospheric pressure grid at a reference elevation, e.g., mean sea-level, based on crowd-sourced pressure readings from mobile devices of opportunity according to the various techniques disclosed herein. Alternatively or in addition the functionality 486 can be adapted to facilitate in whole or in part determination of a height of a mobile device, including its floor location in a multi-story structure, based on a device reported location and pressure reading, in reference to the crowd-sourced pressure readings.

Figure 5:
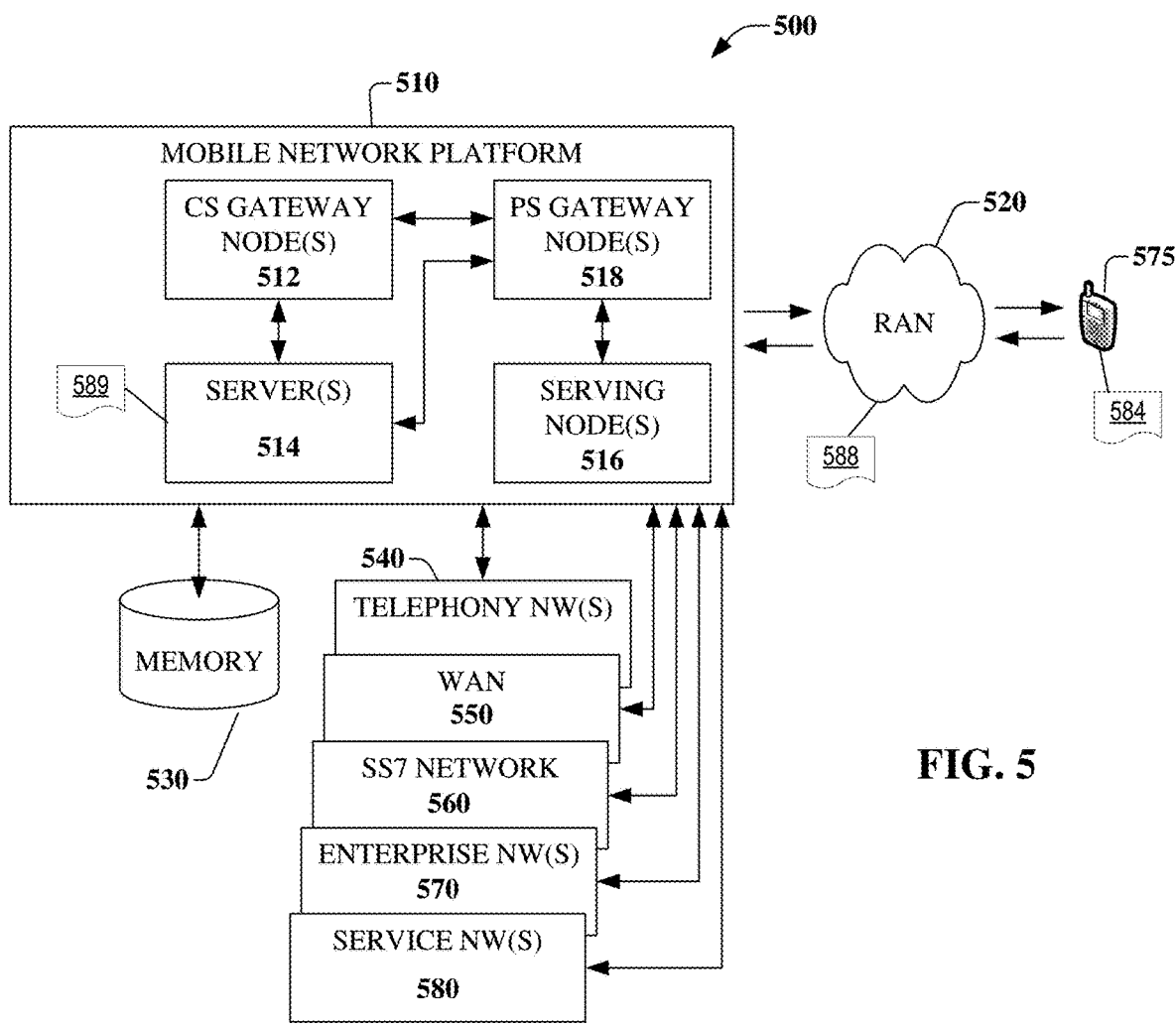
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, embodiment 500 of the mobile network platform 510 can facilitate in whole or in part determination of a reference atmospheric pressure grid at a reference elevation, e.g., mean sea-level, based on crowd-sourced pressure readings from mobile devices of opportunity. In at least some embodiments, the computing environment 400 can further facilitate in whole or in part determination of a location of a mobile device, including a floor location in a multi-story structure, based on a device reported location and pressure reading, in reference to the crowd-sourced pressure readings. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

When used in a crowd-sourced pressure and/or location determining based on crowd-sourced pressure application, the embodiment 500 of the mobile network platform 510 can include one or more of functionality 589 at the server(s) 514, functionality 588 operational within the RAN 520 and/or functionality 584 operational within the mobile device 575. One or more of the disclosed functionalities 584, 588, 589 can be adapted to measure atmospheric pressure proximate to the one or more pressure sensors. Alternatively or in addition, one or more of the disclosed functionalities 584, 588, 589 can be adapted to determination of a reference atmospheric pressure grid at a reference elevation, e.g., mean sea-level, based on crowd-sourced pressure readings from mobile devices of opportunity according to the various techniques disclosed herein. Alternatively or in addition one or more of the disclosed functionalities 584, 588, 589 can be adapted to facilitate in whole or in part determination of a height of a mobile device, including its floor location in a multi-story structure, based on a device reported location and pressure reading, in reference to the crowd-sourced pressure readings.

Figure 6:
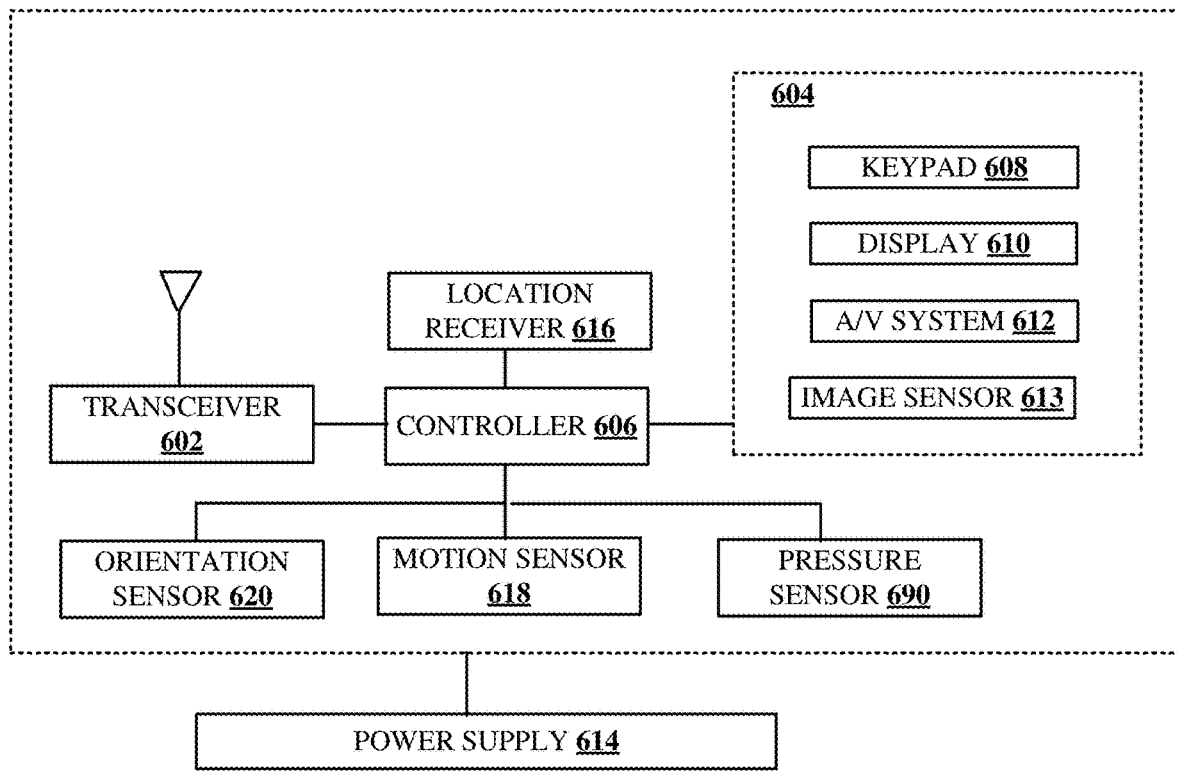
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determination of a reference atmospheric pressure grid at a reference elevation, e.g., mean sea-level, based on crowd-sourced pressure readings from mobile devices of opportunity. In at least some embodiments, the computing device 600 can further facilitate in whole or in part determination of a location of a mobile device, including a floor location in a multi-story structure, based on a device reported location and pressure reading, in reference to the crowd-sourced pressure readings.

The communication device 600 can comprise a wireline and/or wireless transceiver 602 (herein transceiver 602), a user interface (UI) 604, a power supply 614, a location receiver 616, a motion sensor 618, an orientation sensor 620, an environmental sensor, such as an atmospheric or barometric pressure sensor 690 and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
    determining, by a processing system including a processor, that a plurality of mobile devices is at ground level;
    obtaining, by the processing system for the plurality of mobile devices, positions and barometric pressure readings;
    for each mobile device of the plurality of mobile devices:
        comparing, by the processing system, a speed of the mobile device to a speed threshold to obtain a comparison result; and
        inferring, by the processing system, a mode of transportation according to the comparison result;
    determining, by the processing system for the plurality of mobile devices, ground heights with respect to a common reference height to obtain determined ground heights, wherein for each mobile device of the plurality of mobile devices, the determined ground height comprises a sum of a ground elevation above the common reference height corresponding to a position of the mobile device and an offset elevation based at least in part on the mode of transportation of the mobile device;
    combining, by the processing system for the plurality of mobile devices, reference barometric pressures at the common reference height according to the barometric pressure readings and the determined ground heights, to obtain a combined reference pressure; and
    determining, by the processing system, a height of a target device above a local ground position of the target device, in accordance with a reported barometric pressure at the target device and the combined reference pressure.

2. The method of claim 1, wherein the combining the reference barometric pressures comprises averaging at least a portion of the reference barometric pressures.

3. The method of claim 2, further comprising:
associating, by the processing system, a region with an ambiguity affecting a reliability of the determining that the plurality of mobile devices is at ground level;
associating, by the processing system, a mobile device of the plurality of mobile devices with the region according to a location of the mobile device to obtain an associated mobile device; and
excluding, by the processing system, from the averaging a barometric pressure reading of the associated mobile device.

4. The method of claim 1, wherein the processing system receives the report via a radio access network.

5. The method of claim 1, further comprising receiving, by the processing system, a report of a barometric pressure at the target device, wherein the target device is not included in the plurality of mobile devices.

6. The method of claim 1, further comprising transmitting, by the processing system, a message including the height of the target device to a device location service.

7. The method of claim 6, wherein the device location service comprises a first responder service.

8. The method of claim 1, wherein the obtaining the barometric pressure readings further comprises periodically updating the barometric pressure readings.

9. The method of claim 1, wherein the local ground position of the target device corresponds to a building, and wherein the height of the target device is expressed as a floor level of the building.

10. A device comprising:
a processing system including a processor; and
a memory that stores executable instructions that, when executed by the processing system, facilitate performance of operations, the operations comprising:
determining that a plurality of mobile devices is at ground level;
obtaining, for the plurality of mobile devices, positions and barometric pressure readings;
for each mobile device of the plurality of mobile devices:
comparing a speed of the mobile device to a speed threshold to obtain a comparison result; and
inferring a mode of transportation according to the comparison result;
determining, for the plurality of mobile devices, ground heights with respect to a common reference height to obtain determined ground heights, wherein for each mobile device of the plurality of mobile devices, the determined ground height comprises a sum of a ground elevation above the common reference height corresponding to a position of the mobile device and an offset elevation based at least in part on the mode of transportation of the mobile device;
combining, for the plurality of mobile devices, reference barometric pressures at the common reference height according to the barometric pressure readings and the determined ground heights, to obtain a combined reference pressure; and
determining a height of a target device above a local ground position of the target device in accordance with a reported barometric pressure at the target device and the combined reference pressure.

11. The device of claim 10, wherein the combining the reference barometric pressures comprises averaging at least a portion of the reference barometric pressures.

12. The device of claim 10, wherein the processing system operations further comprise receiving the reported barometric pressure at the target device via a radio access network.

13. The device of claim 10, wherein the operations further comprise transmitting a message including the height of the target device to a device location service.

14. The device of claim 13, wherein the device location service comprises a first responder service.

15. The device of claim 10, wherein the obtaining the barometric pressure readings further comprises periodically updating the barometric pressure readings.

16. The device of claim 10, wherein the local ground position at the target device corresponds to a building, and wherein the height of the target device is expressed as a floor level of the building.

17. A non-transitory machine-readable medium comprising executable instructions that, when executed by a processing system including a processor, facilitate performance of operations, the operations comprising:
determining that a plurality of mobile devices is at ground level;
obtaining, for the plurality of mobile devices, positions and barometric pressure readings;
for each mobile device of the plurality of mobile devices:
comparing a speed of the mobile device to a speed threshold to obtain a comparison result; and
inferring a mode of transportation according to the comparison result;
determining, for the plurality of mobile devices, ground heights with respect to a common reference height to obtain determined ground heights, wherein for each mobile device of the plurality of mobile devices, the determined ground height comprises a sum of a ground elevation above the common reference height corresponding to a position of the mobile device and an offset elevation based at least in part on the mode of transportation of the mobile device;
combining, for the plurality of mobile devices, reference barometric pressures at the common reference height according to the barometric pressure readings and the determined ground heights to obtain a combined reference pressure, wherein the combining the reference barometric pressures comprises averaging at least a portion of the reference barometric pressures; and
determining a height of a target device above a local ground position of the target device, in accordance with a reported barometric pressure at the target device and the combined reference pressure.

18. The non-transitory machine-readable medium of claim 17, wherein the processing system receives the reported barometric pressure at the target device via a radio access network.

19. The non-transitory machine-readable medium of claim 17, wherein the mode of transportation of the mobile device is inferred from a speed of the mobile device.

20. The non-transitory machine-readable medium of claim 17, wherein the operations further comprise transmitting a message including the height of the target device to a device location service.

* * * * *

UNITED STATES PATENT AND TRADEMARK OFFICE
CERTIFICATE OF CORRECTION

PATENT NO. : 11,940,294 B2
APPLICATION NO. : 17/673848
DATED : March 26, 2024
INVENTOR(S) : Sheldon Kent Meredith and Zachary Meredith Page 1 of 1

It is certified that error appears in the above-identified patent and that said Letters Patent is hereby corrected as shown below:

On the Title Page (73), The Assignee: "AT & T Intellectual Property I, L.P." should read "AT&T Intellectual Property I, LP."

(73), The Assignee: "AT & T Mobility II LLC" should read "AT&T Mobility II LLC"

In the Claims

Column 34, Line 6, Claim 12: Remove "Processing System"

Signed and Sealed this
Twenty-first Day of May, 2024

Katherine Kelly Vidal
*Director of the United States Patent and Trademark Office*